(12) United States Patent  
Kleyn et al.

(10) Patent No.: US 8,908,027 B2  
(45) Date of Patent: Dec. 9, 2014

(54) ASYMMETRIC DRAG FORCE BEARINGS FOR USE WITH PUSH-CABLE STORAGE DRUMS

(75) Inventors: James F. Kleyn, Santee, CA (US); Eric M. Chapman, Santee, CA (US); Mark S. Olsson, La Jolla, CA (US); Michael E. Turgeon, San Diego, CA (US)

(73) Assignee: Seescan, Inc., San Diego, CA (US)

( * ) Notice: Subject to any disclaimer, the term of this patent is extended or adjusted under 35 U.S.C. 154(b) by 716 days.

(21) Appl. No.: 13/214,208

(22) Filed: Aug. 21, 2011

(65) Prior Publication Data

US 2012/0211580 A1 Aug. 23, 2012

Related U.S. Application Data

(60) Provisional application No. 61/375,701, filed on Aug. 20, 2010.

(51) Int. Cl.
*H04N 7/18* (2006.01)
*F16C 41/00* (2006.01)
*B65H 75/44* (2006.01)
*B65H 75/36* (2006.01)

(52) U.S. Cl.
CPC ............ *B65H 75/364* (2013.01); *F16C 41/001* (2013.01); *B65H 75/4442* (2013.01)

USPC .............................. 348/84; 348/85; 192/45.1

(58) Field of Classification Search
USPC ............................ 348/84, 85; 192/41 R, 45.1
See application file for complete search history.

(56) References Cited

U.S. PATENT DOCUMENTS

| | | | | |
|---|---|---|---|---|
| 4,989,705 | A | * | 2/1991 | Kashio et al. ............ 192/45.019 |
| 4,995,490 | A | * | 2/1991 | Kanai ...................... 192/45.006 |
| 5,176,232 | A | * | 1/1993 | Malecha .................. 192/45.014 |
| 5,573,094 | A | * | 11/1996 | Roberts ................... 192/45.002 |
| 5,903,306 | A | * | 5/1999 | Heckendorn et al. ........... 348/85 |
| 6,135,255 | A | * | 10/2000 | Myers ........................ 192/45.01 |
| 7,406,768 | B2 | * | 8/2008 | Ikeda et al. .............. 29/898.042 |
| 7,889,980 | B2 | * | 2/2011 | Sooy ............................... 396/19 |

* cited by examiner

*Primary Examiner* — Sang Kim

(74) *Attorney, Agent, or Firm* — Steven C. Tietsworth, Esq.

(57) ABSTRACT

A pipe inspection system may include a cable storage drum and a length of resilient flexible push-cable. An asymmetric bearing device supports the cable storage drum for rotation about the rotational axis in a pay-out direction and an opposite pay-in direction. In one embodiment, the asymmetric bearing device automatically decreases, without the for manual adjustment, an amount of friction exerted against rotation of the cable storage drum upon reversal of the direction of rotation of the cable storage drum from the pay-out direction to the pay-in direction.

16 Claims, 17 Drawing Sheets

ASYMMETRIC DRAG FORCE BEARINGS FOR USE WITH PUSH-CABLE STORAGE DRUMS

CROSS-REFERENCE TO RELATED APPLICATIONS

This applications claims priority under 35 U.S.C. §119(e) to U.S. Provisional Patent Application Ser. No. 61/375,701, entitled ASYMMETRIC DRAG FORCE BEARING FOR USE WITH CABLE STORAGE DRUM, filed on Aug. 20, 2010, the content of which is incorporated by reference herein in its entirety for all purposes.

This application is also related to co-pending U.S. patent application Ser. No. 12/704,808, entitled PIPE INSPECTION SYSTEM WITH REPLACEABLE CABLE STORAGE DRUM, filed Feb. 12, 2010, the content of which is hereby incorporated by reference herein in its entirety for all purposes.

FIELD

This disclosure relates generally to cable storage drum assemblies, including asymmetric bearings, for use in pipe inspection and other reel-drum devices and systems. More specifically, but not exclusively, this disclosure relates to cable storage drum assemblies configured with an asymmetric bearing device to provide varying friction levels during deployment and retraction of a push-cable or other mechanism stored in the storage drum.

BACKGROUND

Pipe inspection systems are frequently employed for determining the presence and location of obstructions in pipes, sewers, conduits, and the like. Existing pipe inspection systems may typically include a video or still camera mounted inside a rugged camera head, coupled to the distal or remote end of a resilient flexible push-cable, and a reel or drum for paying out the push-cable during use, and for rewinding the push-cable for stowage.

During inspection, it is often necessary to slowly advance a camera head down the length of a pipe to ensure a comprehensive inspection with precise data capture. Conversely, when the inspection has concluded, it is desirable to quickly withdraw the camera head from the pipe, and wind the push-cable into a compact unit for storage and transport. Although it may be desirable to quickly retract the push-cable after use, push-cables are generally configured to be rigid when deployed (e.g., a push-cable tends to straighten out to a linear shape to support being pushed through a pipe after being stored in a rounded shape when spooled on a reel), which may cause the push-cable to rapidly and uncontrollably feed out when being deployed.

Thus, there are situations where it is desirable to provide a user with variable resistance in such a system (e.g., more friction or operator loading during deployment or pay-out, less friction or loading during retraction or pay-in). Some existing pipe inspection systems provide variable resistance by using a manually adjustable friction brake that is mechanically associated with the rotatable mounting of the cable storage drum on the stand. However, manually adjustable friction brakes create problems due to complexity of operation and design, as well as unreliability.

Accordingly, there is a need in the art to address the above-described as well as other problems.

SUMMARY

In one aspect, this disclosure relates to an asymmetric bearing device. The asymmetric bearing device may be configured to provide a first friction level during a rotation in a first direction and a second friction level during a rotation in an opposite direction. The asymmetric bearing device may be configured to automatically switch between the first and second friction levels in response to a change in rotational direction. The asymmetric bearing may include a race assembly, which may include one or more bearing races, and a friction switching and control assembly, which may include a cog assembly or other variable friction and/or variable friction switching mechanism.

The asymmetric bearing device may include, for example, a first race, a second race, and a cog assembly to control the friction levels and/or switching operation between the friction levels. The cog assembly may be disposed between the first race and the second race. The cog assembly may be configured to provide the first friction level between the first and second race during a rotation of the asymmetric bearing device in a first direction, and the second friction level between the first and second race during a rotation of the asymmetric bearing device in a second direction. The cog assembly In another aspect, the disclosure relates to a cable storage drum assembly including a cable storage drum, a flexible push-cable disposed on the cable storage drum, and an asymmetric bearing device supporting the cable storage drum for rotation within a housing. The cable storage drum assembly may further include a camera coupled to the push-cable.

In another aspect, the disclosure relates to an inspection system for inspecting pipes or other buried or hidden cavities. The inspection system may include, for example, a housing, a cable storage drum, a flexible push-cable disposed on the cable storage drum, and an asymmetric bearing device supporting the cable storage drum for rotation within the housing. The asymmetric bearing device may include, for example, a first race, a second race, and a cog assembly disposed between the first race and the second race. The cog assembly may be configured to provide a first friction level between the first and second race during a rotation of the asymmetric bearing device in a first direction, and a second friction level between the first and second race during a rotation of the asymmetric bearing device in a second direction. The inspection system may include a camera coupled to the flexible push-cable. The inspection system may include an obstruction clearance mechanism to clear an obstruction from the pipe or other buried or hidden cavity. The obstruction clearance mechanism may include a blade or other cutting apparatus. The obstruction clearance mechanism may include a pressurized liquid jetting mechanism.

In another aspect, the disclosure relates to a pipe inspection system. The inspection system may include, for example, a cable storage drum, a length of resilient flexible push-cable having a distal end and a proximal end and wound in substantially circular loops that surround a rotational axis of the cable storage drum, a camera head operatively coupled to the distal end of the push-cable, and an asymmetric bearing device supporting the cable storage drum for rotation about the rotational axis in a pay-out direction and an opposite pay-in direction, the asymmetric bearing device automatically increasing, without the need for manual adjustment, an amount of friction exerted against rotation of the cable storage drum upon reversal of the direction of rotation of the cable storage drum from the pay-in direction to the pay-out direction. The pipe inspection system may further include, for example, a housing for supporting that asymmetric bearing.

In another aspect, the disclosure relates to an asymmetric bearing device. The asymmetric bearing device may include, for example, an inner race, an outer race, a plurality of rotatable friction reducing members positioned between the inner race and the outer race, a friction ramp formed on a first one of the races, and at least one cog supported between the races, where the cog may be slidable to a first position when the inner race is rotated in a first direction relative to the outer race and the cog may be slidable to a second position when the inner race is rotated in the opposite direction relative to the outer race, and where the cog may be configured so that a greater force is required to flex a portion of the cog so that it can engage and slide past the friction ramp when the inner race is rotated in the first direction than the second direction.

In another aspect, the disclosure relates to an asymmetric bearing device. The asymmetric bearing device may include, for example, an inner ring-shaped race formed with a first bearing race groove and a plurality of circumferentially spaced ramp elements, an outer ring-shaped race formed with a plurality of circumferentially spaced friction ramps, a plurality of ball bearings positioned between the inner race and the outer race and sized to roll in the first and second bearing race grooves, and a plurality of cogs each supported between an adjacent pair of ramp elements. Each of the cogs may be slidable to a first position when the inner race is rotated in a first direction relative to the outer race and may be slidable to a second position when the inner race is rotated in the opposite direction relative to the outer race. Each cog may be configured so that a greater amount force is required to flex a portion of the cog to enable it to engage and slide past the friction ramps when the inner race is rotated in the first direction than in the second direction.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
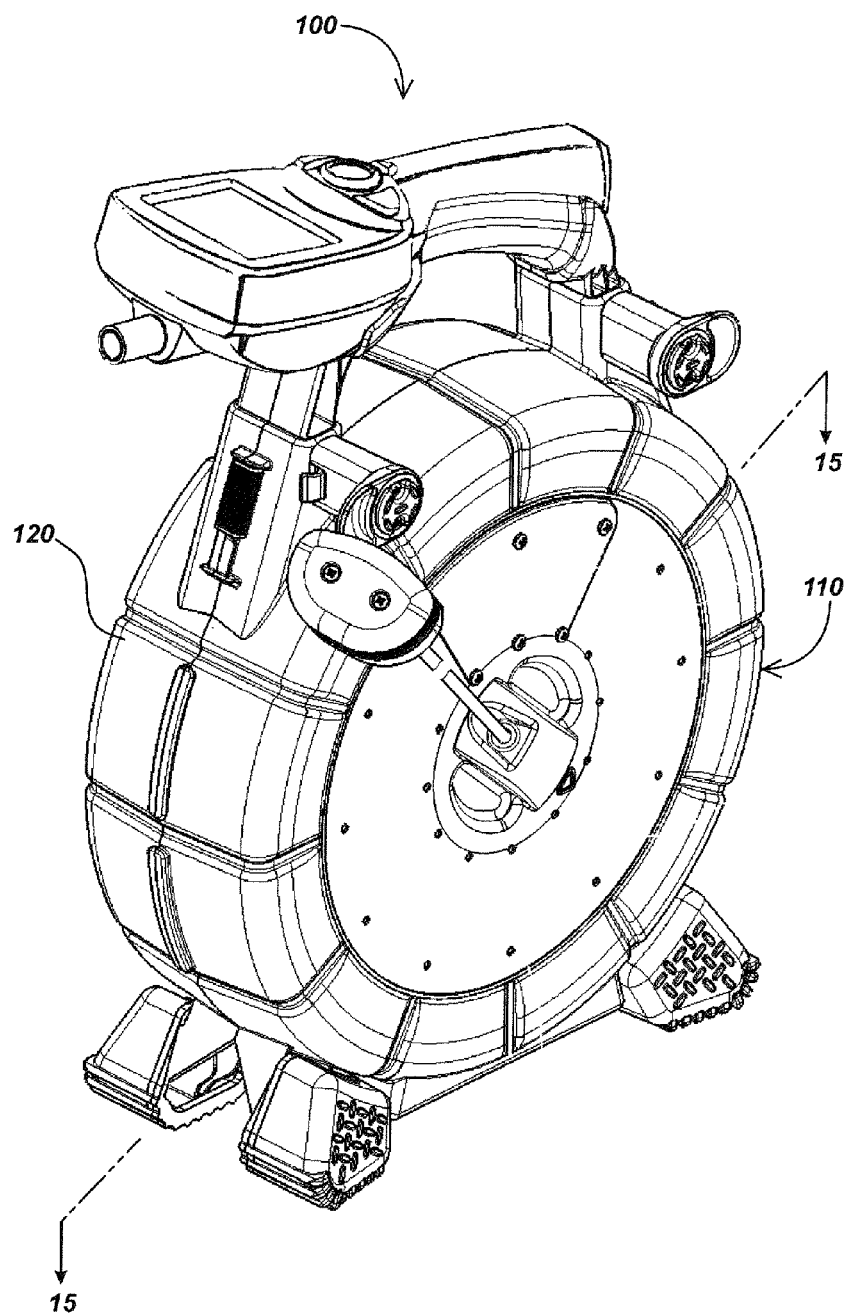
FIG. 1 is an isometric view of an embodiment of a pipe inspection system configured with a cable storage drum assembly.

The present disclosure relates generally to pipe inspection apparatus, systems, and methods. In one aspect, the present disclosure relates to embodiments of an asymmetric bearing device for providing differential or varying friction in such pipe inspection apparatus and systems, along with pipe inspection systems or other devices or systems using such an asymmetric bearing device. For example, embodiments of asymmetric bearing devices in accordance with the present invention may be used in conjunction with various pipe inspection systems, such as those described in U.S. patent application Ser. No. 12/704,808, filed Feb. 12, 2010, the content of which is incorporated by reference herein.

In another aspect, the disclosure relates to an asymmetric bearing. The asymmetric bearing may be configured to provide a first friction level during a rotation in a first direction and a second friction level during a rotation in an opposite direction. The asymmetric bearing may be configured to automatically switch between the first and second friction levels in response to a change in rotational direction. The asymmetric bearing may include a race assembly, which may include one or more bearing races, and a friction switching and control assembly, which may include a cog assembly or other variable friction and/or variable friction switching mechanism.

The asymmetric bearing may include, for example, a first race, a second race, and a cog assembly to control the friction levels and/or switching operation between the friction levels. The cog assembly may be disposed between the first race and the second race. The cog assembly may be configured to provide the first friction level between the first and second race during a rotation of the asymmetric bearing in a first direction, and the second friction level between the first and second race during a rotation of the asymmetric bearing in a second direction.

The first race may include, for example, a cog movement control assembly configured to interact with the cog assembly to facilitate changes in friction between the first friction level and the second friction level. The cog movement control assembly may include a ramp element. Alternately, or in addition, the cog movement control assembly may include a cog rib. The cog assembly may include a plurality of cogs or other elements configured to controllably move between a first position to provide the first friction level and a second position to provide the second friction level. The cogs or other elements may be configured to automatically move between the first and second positions in response to a change in rotational direction of the asymmetric bearing. The cogs may be positioned in contact with a ramp element at a first ramp position and a rib element may be positioned at a first rib position to provide the first friction level, and the cogs may be positioned in contact with the ramp element at a second ramp position and the rib element may be positioned at a second rib position to provide the second friction level.

The asymmetric bearing may further include, for example, a friction element configured to interact with the cogs or other movable or deformable elements to facilitate movement of the cogs or other movable or deformable elements between the first and second positions. The friction element may include a friction ramp. The cogs may include a midsection configured to engage the with the friction ramp to facilitate changing the friction level between the first friction level and the second friction level. The cog may be configured so that the midsection contacts the friction ramp at different areas, shapes, or levels of contact to provide the first and second friction levels. The asymmetric bearing may include a locking mechanism configured to lock the first and second races to contain the cog assembly and a plurality of bearings.

The cogs may be configured, for example, to be relaxed when placed in the first position and flexed when in the second position. The cogs may be configured so as to not contact the friction element in the relaxed position to provide the first friction level, and to contact the friction element in the flexed position to provide the second friction level. Alternately, the cogs may be configured so as to contact the friction element in the relaxed position to provide the second friction level, and not contact the friction element in the flexed position to provide the first friction level. The bearing cogs may include a U-shaped first cog end, a round or bulb-shaped second end, and/or an angular mid-section. The angular mid-section may be configured to contact a friction element to provide one of the first or second friction levels responsive to movement of the cogs.

In another aspect, the disclosure relates to a cable storage drum assembly including a cable storage drum, a flexible push-cable disposed on the cable storage drum, and an asymmetric bearing device supporting the cable storage drum for rotation within a housing. The cable storage drum assembly may further include a camera coupled to the push-cable.

In another aspect, the disclosure relates to an inspection system for inspecting pipes or other buried or hidden cavities. The inspection system may include, for example, a housing, a cable storage drum, a flexible push-cable disposed on the cable storage drum, and an asymmetric bearing device supporting the cable storage drum for rotation within the housing. The asymmetric bearing device may include, for example, a first race, a second race, and a cog assembly disposed between the first race and the second race. The cog assembly may be configured to provide a first friction level between the first and second race during a rotation of the asymmetric bearing device in a first direction, and a second friction level between the first and second race during a rotation of the asymmetric bearing device in a second direction. The inspection system may include a camera coupled to the flexible push-cable. The inspection system may include an obstruction clearance mechanism to clear an obstruction from the pipe or other buried or hidden cavity. The obstruction clearance mechanism may include a blade or other cutting apparatus. The obstruction clearance mechanism may include a pressurized liquid jetting apparatus.

In another aspect, the disclosure relates to a pipe inspection system. The inspection system may include, for example, a cable storage drum, a length of resilient flexible push-cable having a distal end and a proximal end and wound in substantially circular loops that surround a rotational axis of the cable storage drum, a camera head operatively coupled to the distal end of the push-cable, and an asymmetric bearing device supporting the cable storage drum for rotation about the rotational axis in a pay-out direction and an opposite pay-in direction, the asymmetric bearing device automatically increasing, without the need for manual adjustment, an amount of friction exerted against rotation of the cable storage drum upon reversal of the direction of rotation of the cable storage drum from the pay-in direction to the pay-out direction. The pipe inspection system may further include, for example, a housing for supporting that asymmetric bearing.

The asymmetric bearing may include, for example, an inner race, an outer race, and at least one cog supported between the races. One of the races may include one or more ramp elements. The cog may slide to a first position when the cable storage drum is rotated in the pay-out direction and to a second position when the cable storage drum is rotated in the pay-in direction. The cog may be flexed by a friction ramp formed on one of the races to a greater degree when the cable storage drum is rotated in the pay-in direction may be flexed to a lesser degree when the cable storage drum is rotated in the pay-out direction. One of the races may includes one or more ramp elements with a sloped face, wherein a first portion of the cog may slide back and forth along the sloped face to vary a degree of flexibility of a second portion of the cog that engages a friction ramp formed on another one of the races. The cog may include a U-shaped end and/or a bulb-shaped end.

The pipe inspection may further include, for example, a plurality of rotatable friction reducing members separating the inner and outer races. The rotatable friction reducing members may include a plurality of ball bearings engaged with the inner and/or outer races.

In another aspect, the disclosure relates to an asymmetric bearing device. The asymmetric bearing device may include, for example, an inner race, an outer race, a plurality of rotatable friction reducing members positioned between the inner race and the outer race, a friction ramp formed on a first one of the races, and at least one cog supported between the races, where the cog may be slidable to a first position when the inner race is rotated in a first direction relative to the outer race and the cog may be slidable to a second position when the inner race is rotated in the opposite direction relative to the outer race, and where the cog may be configured so that a greater force is required to flex a portion of the cog so that it can engage and slide past the friction ramp when the inner race is rotated in the first direction than the second direction.

One of the races may include, for example, at least one ramp element with a sloped face, and a first portion of the cog may slide back and forth along the sloped face to vary a degree of flexibility of a second portion of the cog that may engage the friction ramp formed on the other one of the races. The plurality of rotatable friction reducing members may include a plurality of ball bearings, roller bearings, or other bearing types. The cog may have a U-shaped end and/or a bulb-shaped end. One race may be formed with a plurality of friction ramps. The cog may have a midsection that engages the friction ramp. The cog may slide in a circumferential direction between the first position and the second position. One or both of the races may be formed with a bearing race groove. One of the races may be formed with a plurality of ramp elements and the asymmetric bearing device may include a plurality of cogs, where each one of the cogs may be slidable circumferentially between and adjacent pair of ramp elements.

In another aspect, the disclosure relates to an asymmetric bearing device. The asymmetric bearing device may include, for example, an inner ring-shaped race formed with a first bearing race groove and a plurality of circumferentially spaced ramp elements, an outer ring-shaped race formed with a plurality of circumferentially spaced friction ramps, a plurality of ball bearings positioned between the inner race and the outer race and sized to roll in the first and second bearing race grooves, and a plurality of cogs each supported between an adjacent pair of ramp elements. Each of the cogs may be slidable to a first position when the inner race is rotated in a first direction relative to the outer race and may be slidable to a second position when the inner race is rotated in the opposite direction relative to the outer race. Each cog may be configured so that a greater amount force is required to flex a portion of the cog to enable it to engage and slide past the friction ramps when the inner race is rotated in the first direction than in the second direction.

Various additional aspects, details, features, and functions are described below in conjunction with the appended Drawing figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Figure 2:
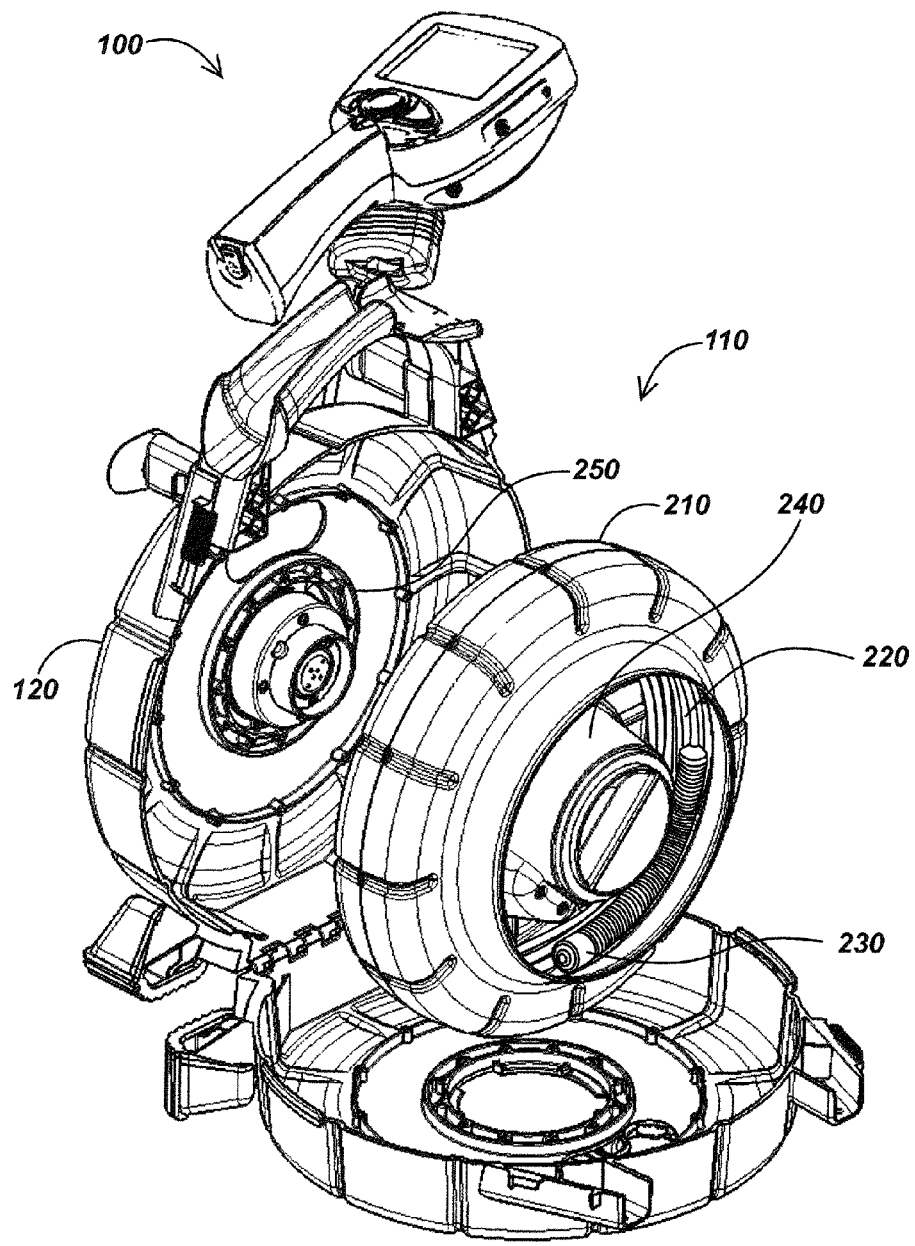
FIG. 2 illustrates details of an embodiment of the cable storage drum assembly of FIG. 1.

Referring to FIG. 1, an embodiment of a pipe inspection system 100 in accordance with aspects of the present invention is shown. Pipe inspection system 100 may include a cable storage drum assembly 110, which may include a cable storage drum, such as a removable donut-shaped cable storage drum 210 (such as shown in FIG. 2), enclosed in an outer housing, such as clam shell housing 120. The cable storage drum may be configured to store a push-cable for deployment in or retrieval from a pipe or other object or cavity. The cable storage drum 210 may be supported for rotation about a horizontal rotational axis (when placed on the ground or other surface in normal operation) in the clam shell housing 120 by an asymmetric bearing device, such as asymmetric bearing device embodiment 350, to deploy or retrieve the push-cable. General details of construction of a pipe inspection system similar to system 100 (without such an asymmetric bearing device) are described in aforementioned pending U.S. patent application Ser. No. 12/704,808. Some embodiments of the present invention relate to combinations of such a pipe inspection system with an asymmetric bearing embodiment, such as those described subsequently herein.

In an exemplary embodiment, the asymmetric bearing device may be configured to provide a different friction or operator mechanical loading level for deployment of the push cable versus retrieval of the push cable. For example, on a reel-based system, an asymmetric bearing may generate more friction or create more operator loading during rotational deployment of a push-cable or other mechanism from the reel than during corresponding retrieval of the push-cable or other mechanism onto the reel. This may be advantageous in applications using push-cables having rigidity that may cause the cable to spool out rapidly and/or uncontrollably when being deployed.

This may be implemented by providing an asymmetric bearing configured to automatically create more friction during one rotational movement than during an opposite rotational movement, and automatically change friction levels during a change in rotation direction. Examples of details of exemplary embodiments of such an asymmetric bearing, along with related elements, are further described below.

In addition to use in a pipe inspection system such as system 100, an asymmetric bearing device in accordance with the present invention, such as asymmetric bearing device embodiment 350 described subsequently, may be used in a wide variety of other mechanical or electro-mechanical systems in which it may be advantageous to automatically impose different levels of friction or loading for different directions of rotation of a rotatable element or mechanism.

Referring to FIG. 2, additional details of embodiments of certain elements of system 100 are illustrated. Clam shell housing 120 is shown in an opened configuration in FIG. 2 to illustrate details and internal components of cable storage drum assembly embodiment 110 of system 100. For example, cable storage drum assembly 110 may include a cable storage drum mechanism, such as storage drum 210, an asymmetric bearing device, such as asymmetric bearing device 350 (not shown in FIG. 2, but illustrated in subsequent figures), a flexible push-cable 220, a camera head 230, as well a central frusto-conical member 240.

A rotational reel assembly such as cable storage drum assembly 110 may be used to stow substantially circular coils of some or all of push-cable 220 during storage of the pipe inspection system, and/or store non-deployed portions of push-cable 220 during deployment or retrieval of the push-cable from within a pipe, conduit, or other cavity. Camera head 230 may be coupled to push-cable 220 with a suitable cable termination assembly (not shown) to provide images or video to a user from within the pipe or other cavity.

The coils of the push-cable 220 may surround or be wrapped around an axis of the cable storage drum 210, which may be defined by a rotational axis of the asymmetric bearing device, such as a rotational axis of asymmetrical bearing device 350. Examples of suitable push-cables and related configurations for use in various embodiments are described in, for example, U.S. Pat. No. 5,939,679, issued Aug. 17, 1999, entitled VIDEO PUSH CABLE, as well as pending U.S. patent application Ser. No. 12/371,540, filed Feb. 13, 2009, entitled PUSH-CABLE FOR VIDEO INSPECTION SYSTEM, the contents of which are hereby incorporated by reference.

A proximal end of push-cable 220 may be operatively coupled to a slip ring assembly (not shown) for routing electrical signals as disclosed in, for example, the aforementioned pending U.S. patent application Ser. No. 12/704,808, such as to provide audio, video, sensors, power, or other signals, data, or information to users and/or for storage for later retrieval and use.

Figure 3:
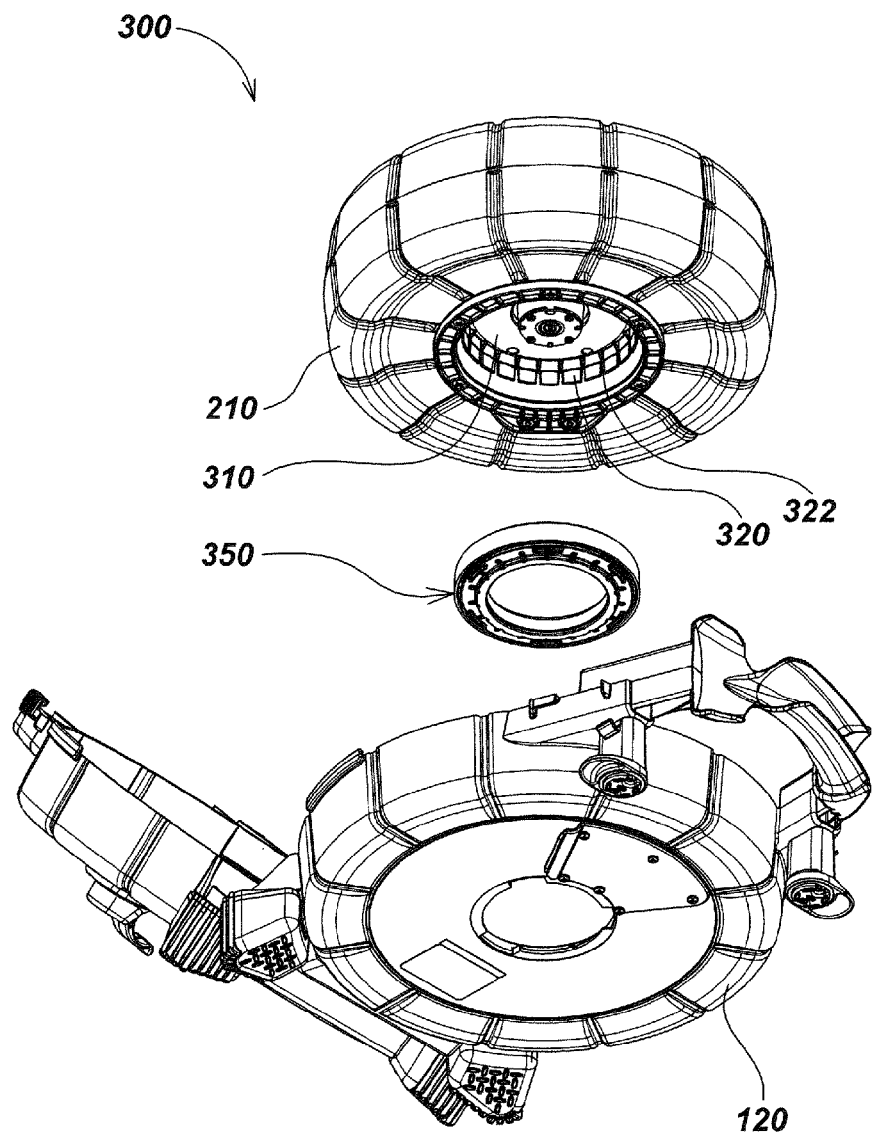
FIG. 3 is an exploded isometric rear view of an embodiment of the cable storage drum assembly of FIG. 1, configured with an asymmetric bearing device.

Cable storage drum 210 may include a central frusto-conical member 240, or other structure, for guiding the push-cable 220 into and/or out of a central opening disposed on the front side of the cable storage drum 210 as the cable storage drum 210 rotates on a bearing surface, such as a surface of an asymmetric bearing, in a pay-out (deployment) and/or a pay-in (retrieval or retraction) direction. For example, in use, the cable storage drum 210 may sit on a bearing flange 250 and be supported by an asymmetrical bearing device, such as asymmetric bearing device 350. The asymmetric bearing device may attach to the rear face of the cable storage drum 210, such as shown in FIG. 3. As used herein, the term "front" refers to the side of a pipe inspection system or cable storage drum from which a push-cable, such as push-cable 220, exits or enters the pipe inspection system or cable storage drum.

FIG. 3 illustrates details of an internal configuration of an embodiment of a cable storage drum assembly 300, including a cable storage drum, such as drum 210, an outer housing, such as housing 120, and an asymmetric bearing device, such as asymmetric bearing device 350. Similarly to FIG. 2, clam shell housing 120 is shown in an open configuration in FIG. 3 to illustrate details of cable storage drum 210 and asymmetric bearing device embodiment 350.

When assembled, asymmetric bearing device 350 may be seated in a central mount 310 of the cable storage drum 210, and may provide support to the cable storage drum 210 when mounted on bearing flange 250. One or more slots, such as, circumferentially spaced axially extending slots 322, may be formed in a cylindrical wall 320 that defines the central mount 310 of the cable storage drum 210. The slots 322 may open on both sides of the cylindrical wall 320 that forms the central mount 310. Each of the slots 322 may receive a corresponding one of a plurality of circumferentially spaced outer race keying structure 520 (such as shown in FIG. 5), which may be formed on an opposite side of asymmetric bearing device 350 so as to firmly fix the cable storage drum 210 relative to the asymmetric bearing device 350 during rotation.

Figure 4:
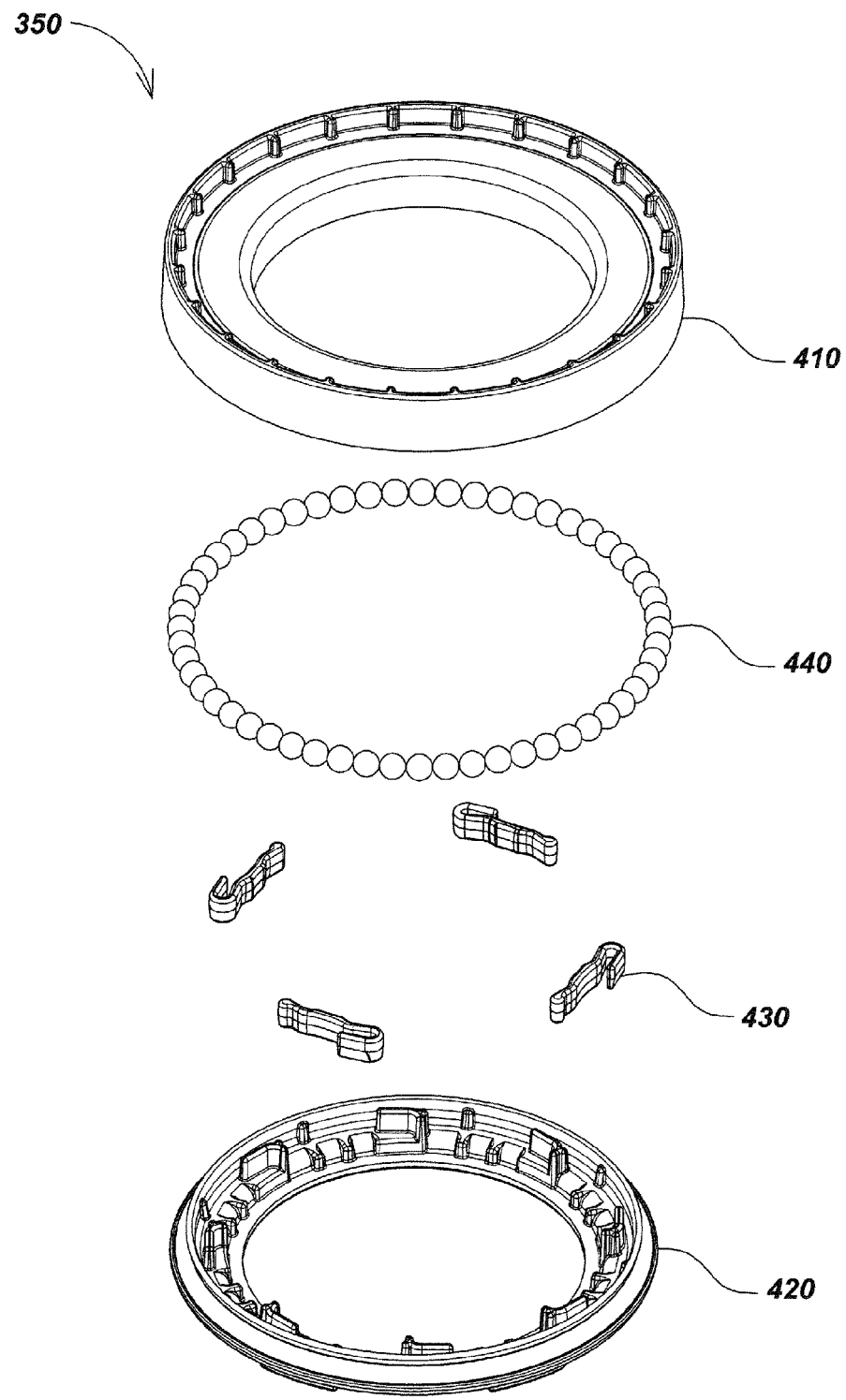
FIG. 4 is an enlarged exploded isometric view illustrating details of an embodiment of the asymmetric bearing device of FIG. 3.

Referring to FIG. 4, certain details of asymmetric bearing device embodiment 350 are illustrated. For example, asymmetric bearing device embodiment 350 may include one or more bearing races, such as an outer race 410 and an inner race 420, along with one or more circumferentially sliding cogs 430, which may collectively comprise a cog assembly, along with one or more ball bearings 440. The cogs (or other similar or equivalent elements) may be configured to interact with elements of the bearing races, such as described subsequently herein with respect to, for example, FIG. 11 and FIG. 12, to provide different frictional levels during different rotational direction movements of the asymmetric bearing device.

The asymmetric bearings may be made from various materials. For example, the sliding cogs 430 may be molded out of PA 66 standard polyamide Nylon, or other suitable polymer or other materials. Ball bearings 440 may be metallic, ceramic, or may be molded of a thermoplastic material, such as Delrin, or other suitable polymer or other materials. For example, one or more ball bearings 440 may comprise a steel material, such as stainless steel or chrome steel, and may be alternated with those molded of a thermoplastic material, such as Delrin. In one aspect, ball bearings 440 formed from Delrin may be inserted in between every other one of ball bearings 440 comprising steel to reduce rolling and increase friction. Outer race 410 and/or inner race 420 may be molded of ABS plastic or other suitable materials.

Figure 5:
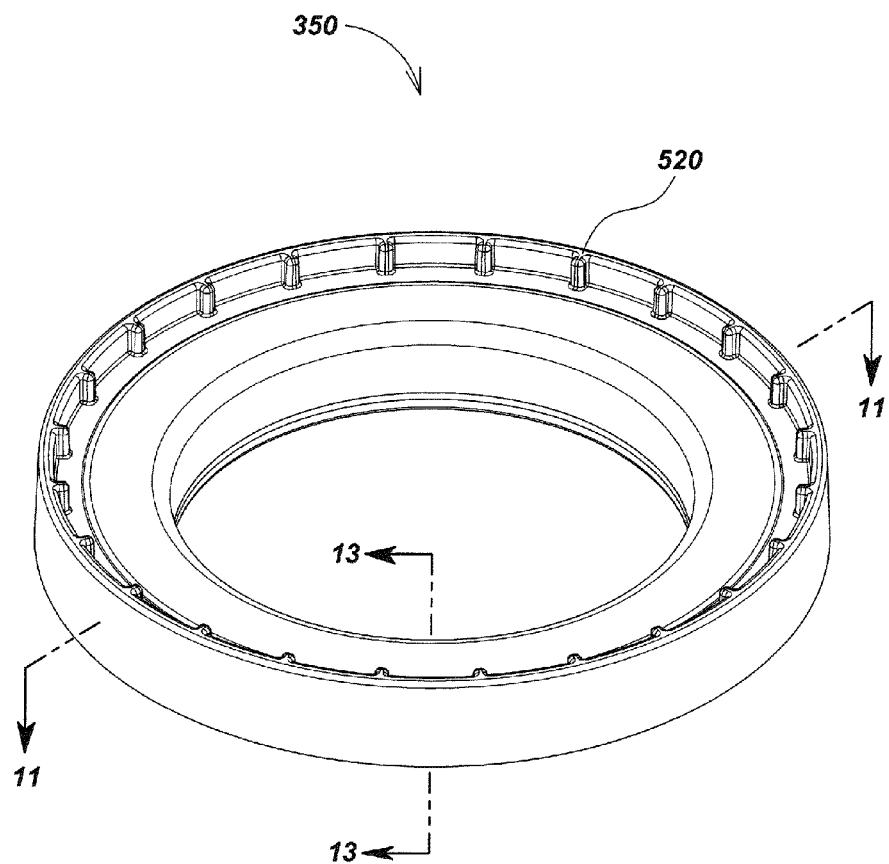
FIG. 5 is an enlarged plan isometric view of an embodiment of an assembled asymmetric bearing device.

Referring to FIG. 5, details of the outer race embodiment 410 of asymmetric bearing 350 are illustrated. Outer race 410 may be formed with a keying or locking structure, such as circumferentially spaced outer race keying structure 520, which may be distributed along the inner periphery. The outer race keying structure 520 may be formed as uniformly or non-uniformly spaced protuberances or keys on the center-facing cylindrical surface of a raised lip or other structure along the circumference of the outer race 410. During assembly, the keying structure 520 of the outer race 410 may mate with corresponding mating structures, such as slots 322 in the cylindrical wall 320 of the cable storage drum 210 (such as shown in FIG. 3) to engage the outer race 410 of asymmetric bearing 350, either firmly or loosely, with the cable storage drum 210.

Figure 6:
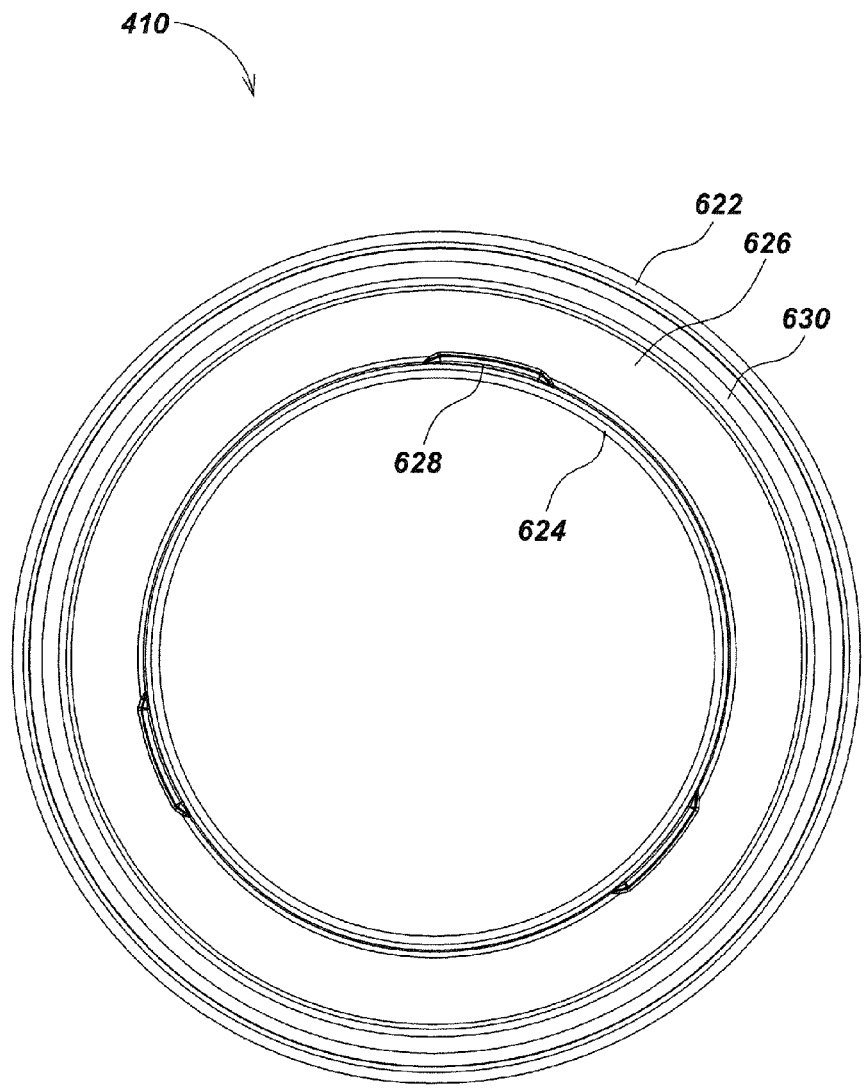
FIG. 6 is an enlarged rear plan view of an embodiment of an outer race of the asymmetric bearing device embodiment of FIGS. 4 and 5.

Referring to FIG. 6, additional details of outer race embodiment 410 are illustrated from the rear face. For example, an internal surface of the outer race 410 may be formed by an outer wall 622, an inner wall 624, and a base surface 626. The inner wall 624 may be formed with a series of one or more friction elements, which may be configured in a ramp or other configuration and which may be equidistantly or non-uniformly spaced, such as friction ramps 628 as shown. The friction ramps 628 may be circumferentially located along the inner wall 624, and may be facing the outer wall 622. The friction elements may interact with elements of the cog assembly to provide variable friction depending on the direction of rotation of the asymmetric bearing device.

An outer race bearing groove 630, or other structure, which may be of a partially circular cross-section configuration, may be formed circumferentially along the base surface 626 along the bottom edge of the outer wall 622. The bearing race groove 630 may be used to support a circular array of ball bearings, such as ball bearings 440 (such as shown in FIG. 4). The ball bearings 440 may have a diameter that is sized to conform to the radius of the part circular cross-section of the outer race bearing groove 630 to facilitate rotational movement of the asymmetric bearing.

Figure 7:
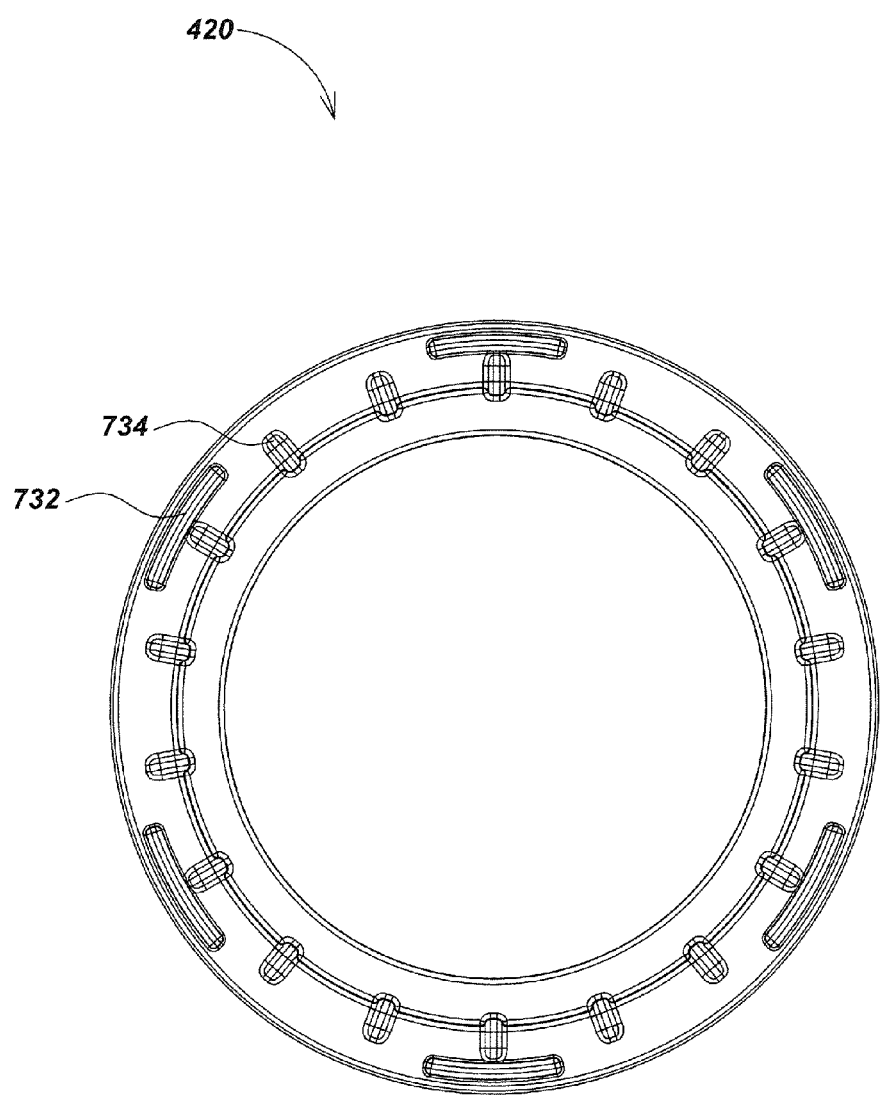
FIG. 7 is an enlarged front plan view of an embodiment of an inner race of the asymmetric bearing device embodiment of FIGS. 4 and 5.

Referring to FIG. 7, details of inner race embodiment 420 are illustrated from the rear face. For example, a locking mechanism, such as a series of inner race keying ridges 732 and/or a series of inner race keying radial recesses 734, may be formed into an outer circular edge of the inner race 420. When assembled, the inner race keying ridges 732 and/or the inner race keying radial recesses 734 may mate with corresponding concavities and protrusions (or other locking elements) molded into the surface of a housing, such as clam shell housing 120. In this configuration, inner race 420 may be held in a fixed orientation relative to the clam shell housing 120, while outer race 410 may be fixed relative to the cable storage drum 210 and may rotate with the cable storage drum 210 around the inner race 420.

Figure 8:
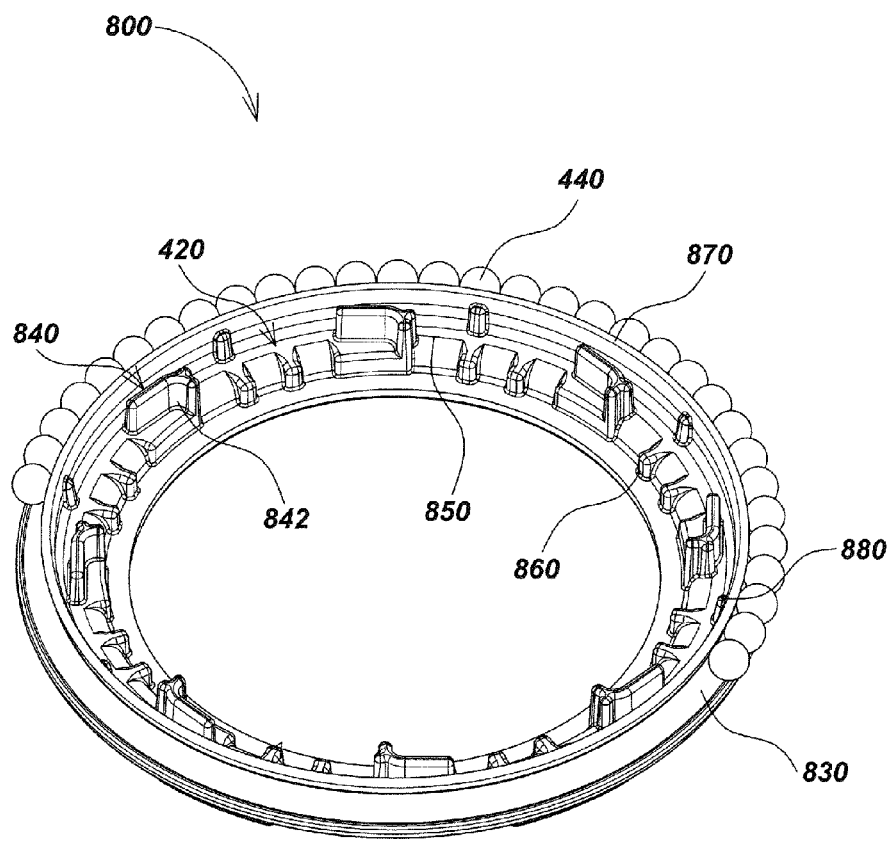
FIG. 8 is an enlarged isometric view of an embodiment of an asymmetric bearing device assembly.

Referring to FIG. 8, additional details of inner race embodiment 800 are illustrated. For example, elements disposed on the inner race 420 of inner race embodiment 800 may include an inner race bearing groove 830, a separating wall 870, as well as a cog movement control assembly, which may include elements such as one or more ramp elements 840, which may be formed into an inner shoulder 850, one or more axial cog ribs 880, as well as one or more small protruding ridges 860. In operation, the cog movement control assembly may interact with cog assembly elements, such as cogs 430, to vary the shape or orientation of the cog assembly elements to change rotation friction depending on direction of rotation. For example, the flexibility of cogs 430, or other cog assembly elements, may be changed upon movement of the cogs from a first position to a second position to vary their flexibility and thereby vary friction on an associated friction element in contact with the cogs 430.

In an exemplary embodiment, the cog movement control assembly includes ramps, such as ramp elements 840, which may interact with other elements, such as sliding cogs 430 as shown in FIG. 4 (or other similar or equivalent elements), to control application of frictional forces in asymmetric bearing device 350, such as described subsequently with respect to FIG. 11 and FIG. 12. Ridges 860 may be evenly or non-evenly distributed between each pair of the ramp elements 840 along the circumference of the lower section of the inner shoulder 850. Ribs, such as one or more axial cog ribs 880, may be further included in the cog movement control assembly, to further interact with sliding cogs 430 to control application of frictional forces, such as described subsequently with respect to FIG. 11 and FIG. 12. Other configurations of cog movement control assembly elements and configuration that provide similar functionality may alternately be used in various embodiments.

Inner race bearing groove 830 may provide a track or compartment for containing or controlling movement of ball bearings, such as ball bearings 440 (such as shown in FIG. 4), when assembled. In FIG. 8, a fraction of the ball bearings 440 that would be used in a typical implementation are omitted to better illustrate curvature of the outer bearing race groove 830; however, in a typical implementation, bearings, such as ball bearings 440, surround the inner race bearing groove 830.

When the components of an asymmetric bearing such as asymmetric bearing device embodiment 350 are assembled, the ball bearings 440 may be held in place or controlled, such as under the edge of the outer race bearing groove 630 (such as shown in FIG. 6), and by the curved surface of inner race bearing groove 830 of inner race 420. The outer race 410 and the inner race 420 may be configured and dimensioned with ball bearings 440 such that a mechanical connection, such as a firm snap-fit, occurs when the inner race 420 and the outer race 410 are pressed together, thus holding the inner race, outer race, and bearings loosely together and free to turn relative to one another. Other connection mechanisms may also be used in various embodiments.

As noted previously, in one aspect, the present invention relates to providing varying or different friction or loading between deployment of the push-cable and retrieval of the push-cable. In order to effect such a variation, in an exemplary embodiment, ramp elements 840 (or other similar or equivalent configurations) may be used in conjunction with other elements to control applied friction. For example, ramp elements 840 may comprise part of a mechanism for providing differential rotation rates (e.g., corresponding to different applied friction in the asymmetric bearing) when asymmetric bearing device 350 rotates with cable storage drum, such as cable storage drum 210, in a pay-out direction versus a pay-in direction. To implement this, ramp elements 840 may be concentrically enclosed by separating wall 870, and may be configured to gradually slope downward, away from the separating wall 870, further curving inward towards the center of the inner race 420. In an exemplary embodiment, the ramp elements 840 curve downward and away from separating wall 870 until they are abruptly curved inward at a curve structure 842 towards the center of the inner race 420. The configuration may interact with a cog element, such as described subsequently with respect to FIG. 11 and FIG. 12, to automatically control applied friction. Other similar or equivalent configurations may alternately be used in some embodiments.

Figure 9:
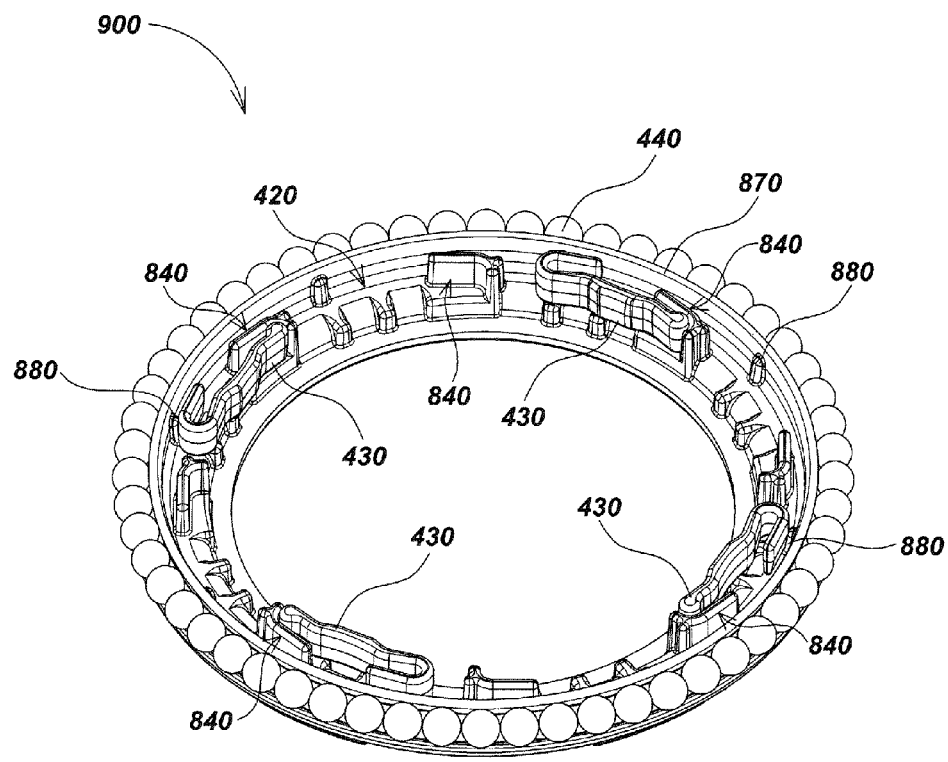
FIG. 9 is an enlarged isometric view illustrating details of an alternate embodiment asymmetric bearing device assembly.

FIG. 9 illustrates details of a cog and inner race assembly 900, such as may be implemented with sliding cog embodiment 430 in conjunction with inner race embodiment 420. As shown in FIG. 9, sliding cogs 430 may be seated between pairs of ramp elements 840. In various embodiments, one or more sliding cogs 430 may be used. For example, additional cogs may be used to increase frictional levels to a desired friction level for a particular application. In configurations where pairs of sliding cogs 430 are placed opposite each other, such as, for example, when two, four, or six sliding cogs 430 are used, each of the sliding cogs 430 may be configured in a mirror-image relationship to another such that each cog turns in the same direction during rotation of the asymmetric bearing device 350.

Figure 16:
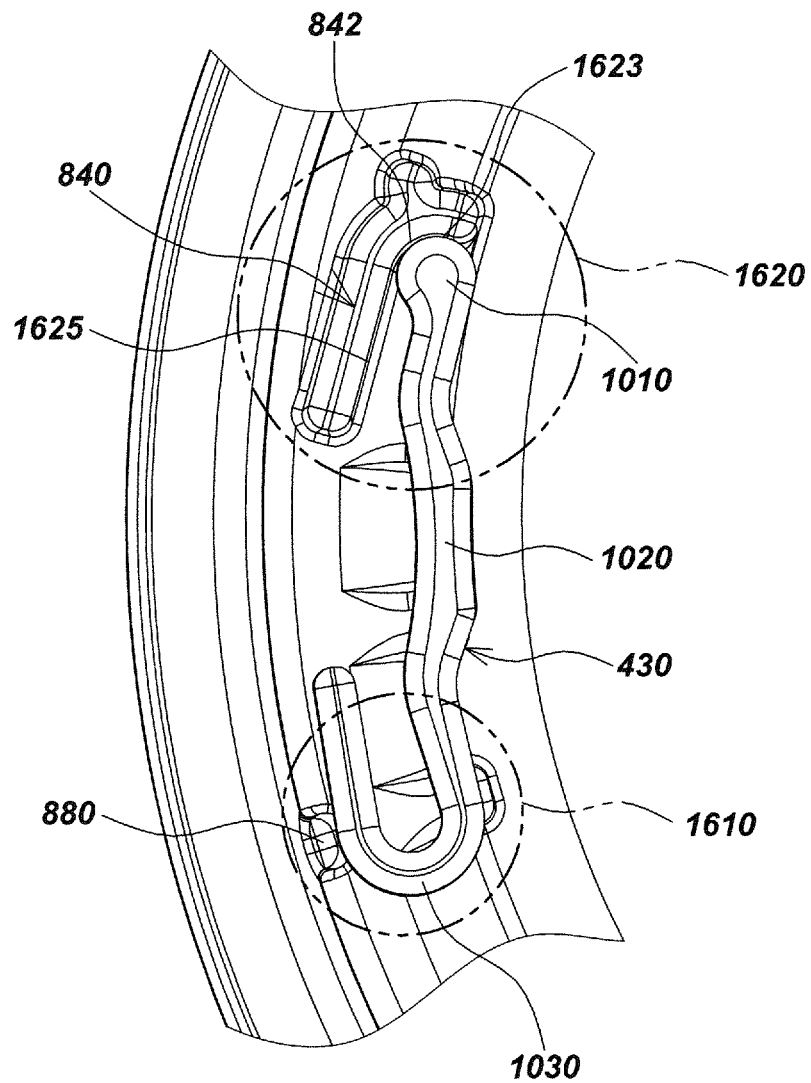
FIG. 16 illustrates additional details of the view illustrated of FIG. 11.
Figure 17:
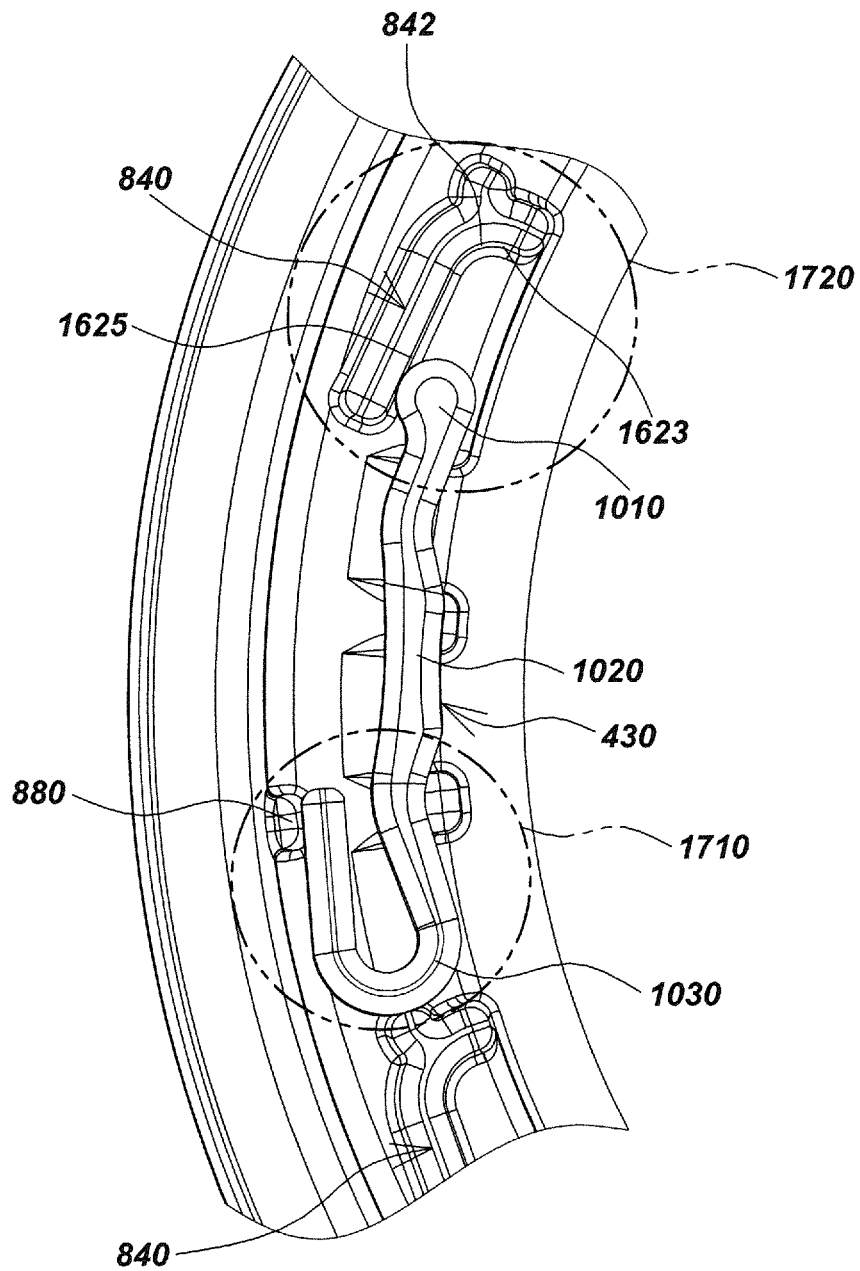
FIG. 17 illustrates additional details of the view illustrated in FIG. 12.

Each pair of ramp elements 840 may be spaced, to provide each of corresponding sliding cogs 430, an area to slide along a sloped face 1625 of the corresponding ramp element 840 (such as shown in area 1620 of FIG. 16 and area 1720 of FIG. 17). As described subsequently, the sliding action may be used to change applied frictional force during a change in drum rotation. The sliding cogs 430 may be dimensioned such that the width is approximately equal to the height of the separating wall 870. One or more rib structures, such as axial cog ribs 880 as shown in FIG. 8 and FIG. 9, may be formed along the inward face of the separating wall 870 to interact with corresponding sliding cogs 430. Each rib may be seated between each pair of adjacent ramp elements 840. Each of the sliding cogs 430 may be in contact with each of the axial cog ribs 880. The contact point may change when the sliding cogs change position (as described subsequently with respect to FIG. 11 and FIG. 12).

Figure 10:
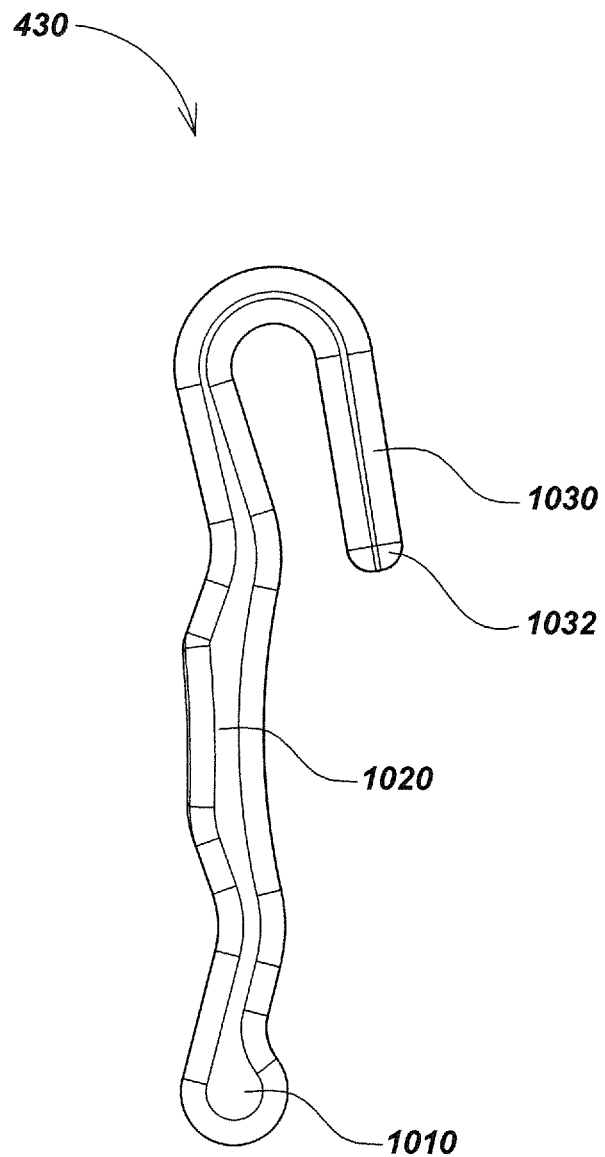
FIG. 10 is an enlarged side view of an embodiment of one of the sliding cogs as shown in FIGS. 4 and 9.

FIG. 10 illustrates additional details of sliding cog embodiment 430 (such as shown in FIG. 4 and FIG. 9). In the exemplary embodiment illustrated in FIG. 10, each sliding cog 430 may be configured to have varying flexibility depending on their position with respect to other elements (such as ramp elements 840 and axial cog ribs 880). To implement this, in one embodiment each sliding cog 430 may include a rounded or bulb-shaped end 1010, an angular midsection 1020, and a U-shaped end 1030. The angular midsection 1020 of the sliding cog 430 may be slightly raised inwards (when positioned as shown in FIG. 9) relative to the center of inner race 420. The U-shaped end 1030 may terminate in a rounded tip 1032. The U-shape, or other similar or equivalent configuration, may be used to facilitate varying flexion of the cog depending on its position relative to other elements. Examples of this action are described subsequently with respect to FIG. 11 (illustrating cog and race interaction during deployment or pay-out) and FIG. 12 (illustrating cog and race interaction during retrieval, retraction or pay-in).

Figure 11:
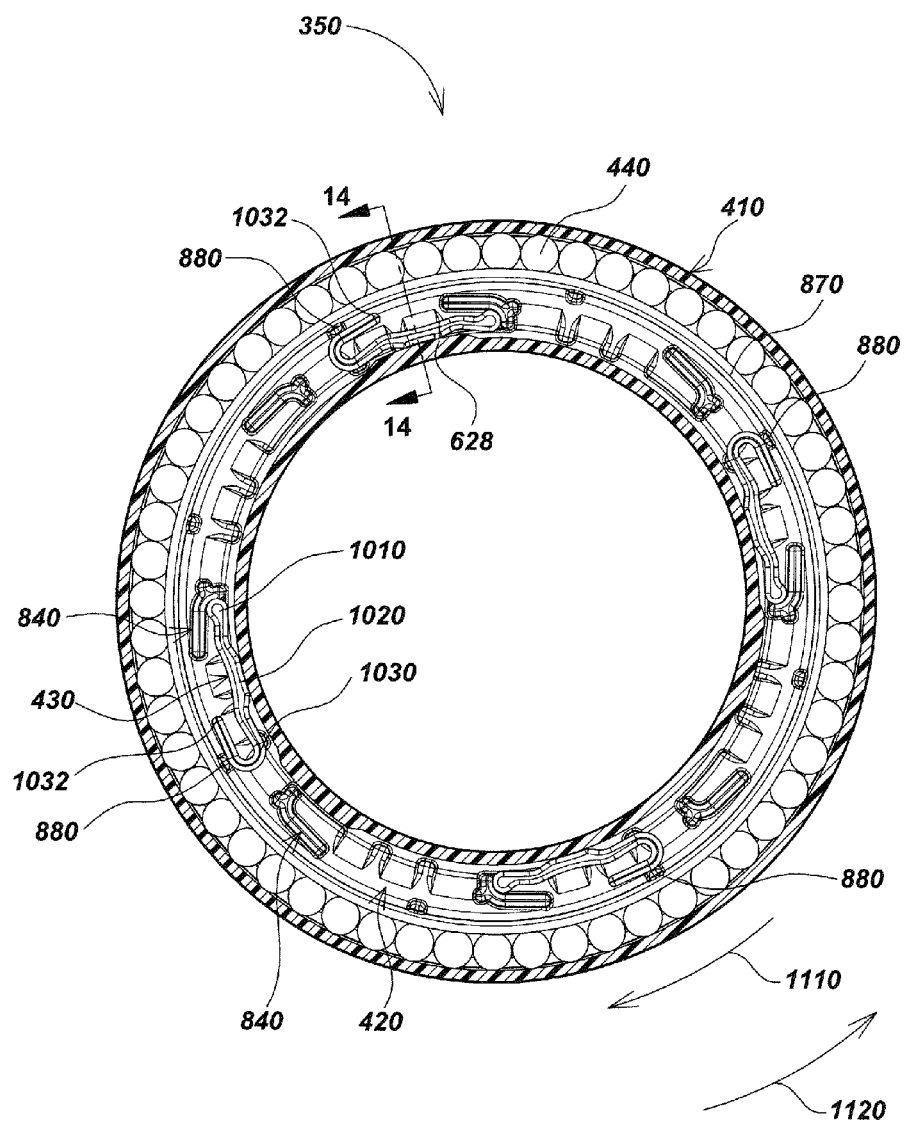
FIG. 11 is a horizontal section view of the asymmetric bearing device embodiment of FIG. 5, taken along line 11-11, illustrating a configuration during clockwise pay-out rotation.

FIG. 11 illustrates a horizontal section view of asymmetric bearing embodiment 350, taken along line 11-11 (as shown in FIG. 5), to illustrate the configuration of inner race 420, sliding cogs 430, ramp elements 840, and other elements when asymmetric bearing 350 is rotated in a pay-out direction (e.g., clockwise pay-out direction 1110 as shown). As noted previously, to implement varying friction or loading, different forces may be applied to sliding cogs 430 and associated elements during deployment than during retraction actions. In order to implement this functionality, an asymmetric bearing configured such as described below may be used. In some embodiments, other similar or equivalent configurations may alternately be used.

In operation, a rounded or bulb-shaped end 1010 of each of the sliding cogs 430 may be configured to slide against one of the ramp elements 840, and a U-shaped end 1030 may be configured to slide against an adjacent axial cog rib 880. The bulb-shaped ends 1010 may be positioned to make contact with associated ramp elements 840, while the U-shaped ends 1030 may be in contact with associated axial cog ribs 880, which may be disposed between each pair of the ramp elements 840.

During rotation in clockwise pay-out direction 1110, the axial cog rib 880 may be positioned as shown in FIG. 11 to support the U-shaped end 1030 of the sliding cog 430 closer to the curved segment of the "U" shape ("U-shaped" end) at a first rib position. This positioning is further detailed in FIG.

16, which illustrates example contact points between U-shaped end 1030 and axial cog rib 880 within area 1610 during rotation in the pay-out direction.

Figure 12:
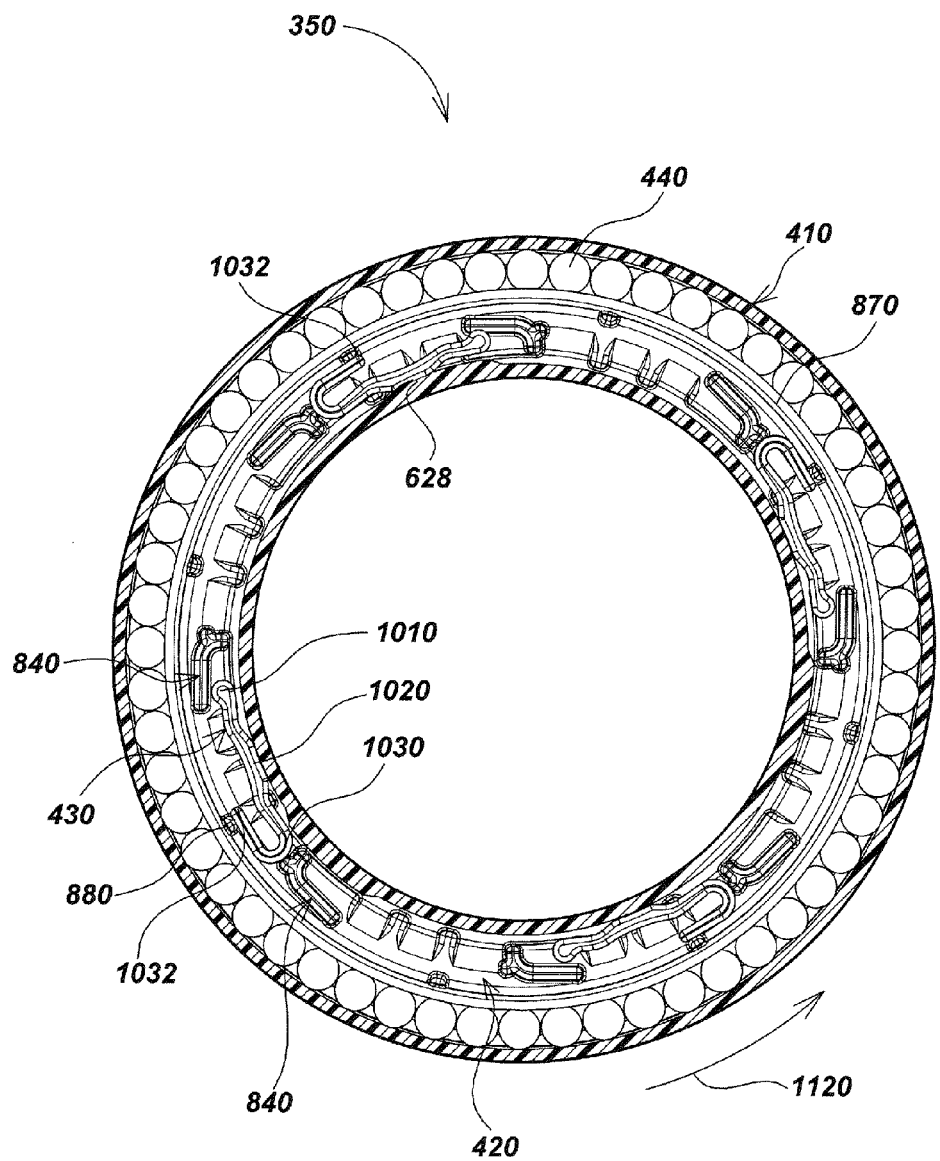
FIG. 12 is a horizontal section view of the asymmetric bearing device embodiment of FIG. 5, taken along line 11-11, illustrating a configuration during counter-clockwise pay-in rotation.

Conversely, during rotation in a counter-clockwise pay-in direction 1120, the cog may move, thereby shifting the support point of the axial cog rib 880 closer to the open end of the U-shaped end 1030 as shown in FIG. 12 (bearing configurations in rotation direction 1120 are described subsequently with respect to FIG. 12) to a second rib position. This positioning is further detailed in FIG. 17, which shows example contact between U-shaped end 1030 and axial cog rib 880 during rotation in the pay-in direction within an area 1710. By facilitating movements of the sliding cogs 430 between the first and second positions shown in FIG. 11 and FIG. 12 respectively (and correspondingly in FIG. 16 and FIG. 17), different frictional loading may be provided in pay-out and pay-in rotational movements of the asymmetrical bearing.

To implement this action, U-shaped end 1030 may be configured to be more flexible when pressure is applied at or near the open part of the U-shaped end (e.g., as shown in area 1710 of FIG. 17), and less flexible when pressure is applied closer to the curved segment of the U-shaped end 1030 (e.g., as shown in area 1610 of FIG. 16). During pay-out, when axial cog ribs 880 support U-shaped ends 1030 near the bend (as shown in area 1610), additional support is provided to the sliding cogs 430, and therefore only a small amount of bend and flex may occur in the U-shaped ends 1030, which may minimize movement of area 1020.

Conversely, more flex may occur when the U-shaped ends 1030 are supported near the open area (e.g., during pay-in, as shown in FIG. 17). For example, when axial cog ribs 880 support sliding cogs 430 closer to the open end of the U-shaped ends 1030, as shown in area 1710 of FIG. 17), less support is provided to the sliding cogs 430, and an increase in bend and flex may occur in the lower arm of the U-shaped ends 1030 as friction ramps 628 (such as shown in FIG. 6) pass under the sliding cogs 430 and press them outward.

In addition to interaction between U-shaped ends 1030 and axial cog ribs 880 as described above, interaction between bulb-shaped ends 1010 and ramp elements 840, as well as U-shaped ends 1030 and axial cog ribs 880, may also be used to vary applied friction. For example, during rotation in pay-out direction 1110, the bulb-shaped end 1010 of each of the sliding cogs 430 may be forced slightly inward toward the hub of rotation by the presence of a stop element 1623, such as shown in an area 1620 of FIG. 16 to illustrate a first ramp position of the ramp element 840, which may lever the U-shaped end 1030 of the sliding cog 430 outward against the axial cog rib 880.

During rotation in the clockwise pay-out direction 1110, friction interference contact may occur each time the angular midsection 1020 of sliding cogs 430 encounters one of the friction ramps 628 (such as shown in FIG. 6) formed in the periphery of the inner wall 624 of outer race 410. The degree of friction interference during rotation may be controlled by varying the number of sliding cogs 430 and/or friction ramps 628 in a particular embodiment. For example, by increasing the number of sliding cogs 430 and/or the friction ramps 628, the more instances of frictional drag will occur in each rotation of the asymmetric bearing device and corresponding cable storage drum (or other attached mechanism).

Addition of drag caused by friction generated from the interaction between the sliding cogs and friction ramps (or other similar or equivalent structures) makes paying out of a push-cable or other mechanism from a storage drum or other mechanism more readily controllable by the operator, which may provide advantages such as reducing or eliminating the risk of the cable storage drum free-wheeling and releasing coils of the push cable (or other mechanism) in an uncontrolled manner.

Conversely, when a push-cable or other mechanism is being retracted/payed-in to a cable storage drum or other device, less fine control is generally needed and the risk of coils of the push cable (or other mechanism) springing out uncontrolled is reduced. In some embodiments, the relative amount of friction needed for deployment versus retrieval may be reversed. In this applications, the configuration may be adjusted so as to provide greater frictional force or loading during retrieval than during deployment. In addition, in some embodiments, adjustment mechanisms may be used to provide further variation in the applied friction. For example, a user control, such as a dial or other adjustment mechanism, may be included to vary the applied friction by adjusting the position of elements such as the cogs, ramps, ribs, or other elements.

FIG. 12 illustrates a horizontal section view of asymmetric bearing embodiment 350, taken along line 11-11 (as shown in FIG. 5), to illustrate the configuration of inner race 420, sliding cogs 430, ramp elements 840, and other elements when asymmetric bearing 350 is rotated in a pay-in direction (e.g., counter-clockwise pay-out direction 1120 as shown). The positioning of these elements as shown in FIG. 12 can be considered as an opposite orientation to that shown in FIG. 11.

Friction ramps 628 (such as shown in FIG. 6) of the outer race 410 may be configured to cause the sliding cogs 430 to slide counter-clockwise when the cable reel or other mechanism is similarly rotated. In this orientation, bulb-shaped ends 1030 of sliding cogs 430 may slide along sloped face 1625 of corresponding ramp elements 840 (as further illustrated in area 1720 of FIG. 17) to a second ramp position. In addition, the U-shaped ends 1010 may move toward, and rest on, axial cog ribs 880 near the open end of the U-shaped ends 1030 as shown in further detail in area 1710 of FIG. 17. In this configuration, the U-shaped ends 1030 may flex more readily than in the configuration shown in FIG. 16 as the friction ramps 628 pass under the angular midsection 1020 of each of the sliding cogs 430. As a result of this change in the position and resulting increase in flexibility, friction may be reduced in the bearing when rotating in direction 1120 (e.g., a counter clockwise pay-in direction).

Figure 13:
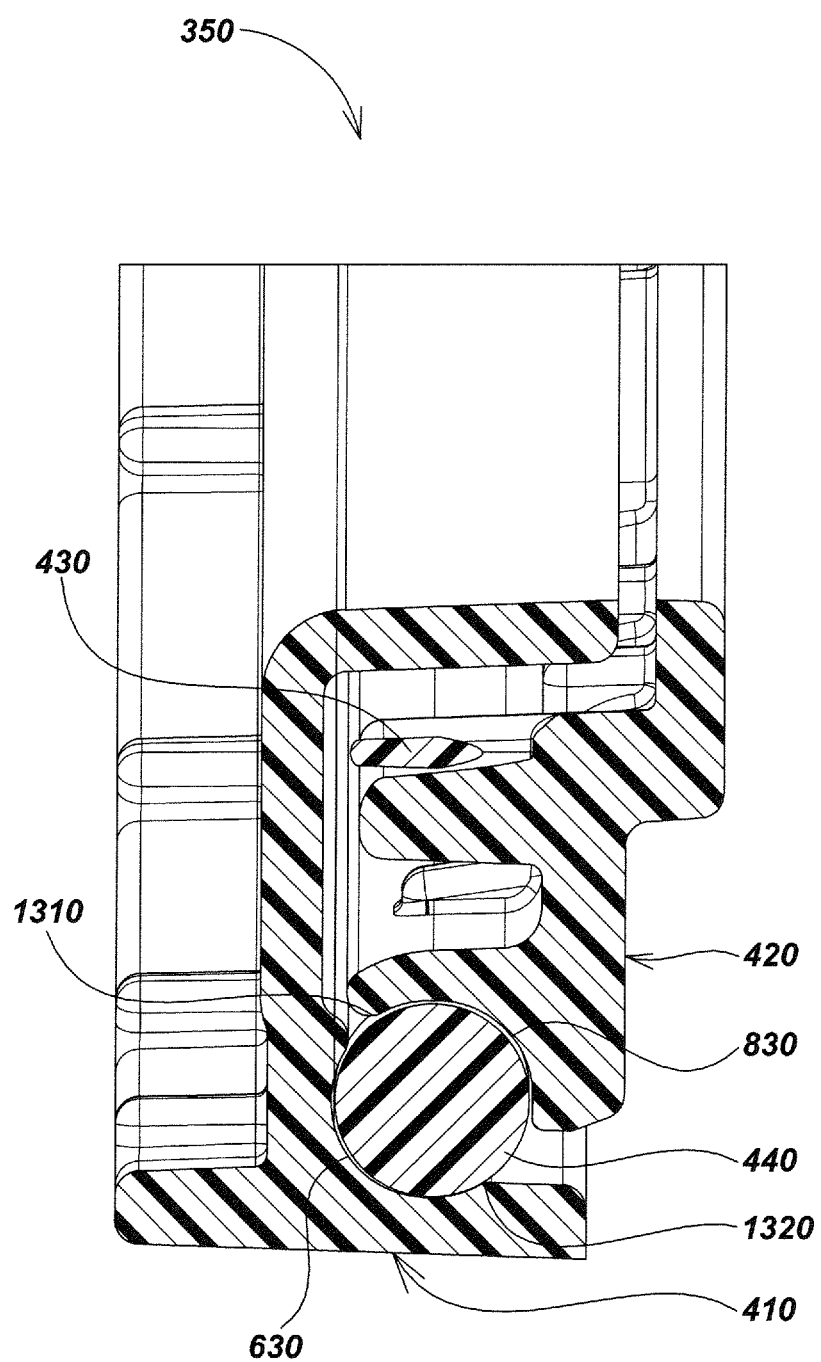
FIG. 13 is an enlarged vertical section view of the asymmetric bearing device embodiment of FIG. 5, taken along line 13-13, illustrating a locking mechanism of the inner and outer races.

FIG. 13 is a vertical section view of certain details of asymmetric bearing device embodiment 350 taken along line 13-13 (as shown in FIG. 5), illustrating a locking mechanism of the outer race 410, inner race 420, and ball bearings 440. When assembled, the ball bearings 440 may be held under an inner overhanging edge 1310 of the inner race bearing groove 830 of the inner race 420, and may be further constrained by an outer overhanging edge 1320 of the outer race bearing groove 630 in the outer race 410. The inner race 420 and outer race 410 may be configured and dimensioned to mechanically couple, such as by a snap-fit that occurs when the outer bearing race groove 830 is populated with ball bearings 440 and the two races are pressed together, thereby holding the inner race 420 and outer race 410 together. The elements shown in FIG. 13 may typically be configured for a loose fit; however, a tight fit may be used in some embodiments.

Figure 14:
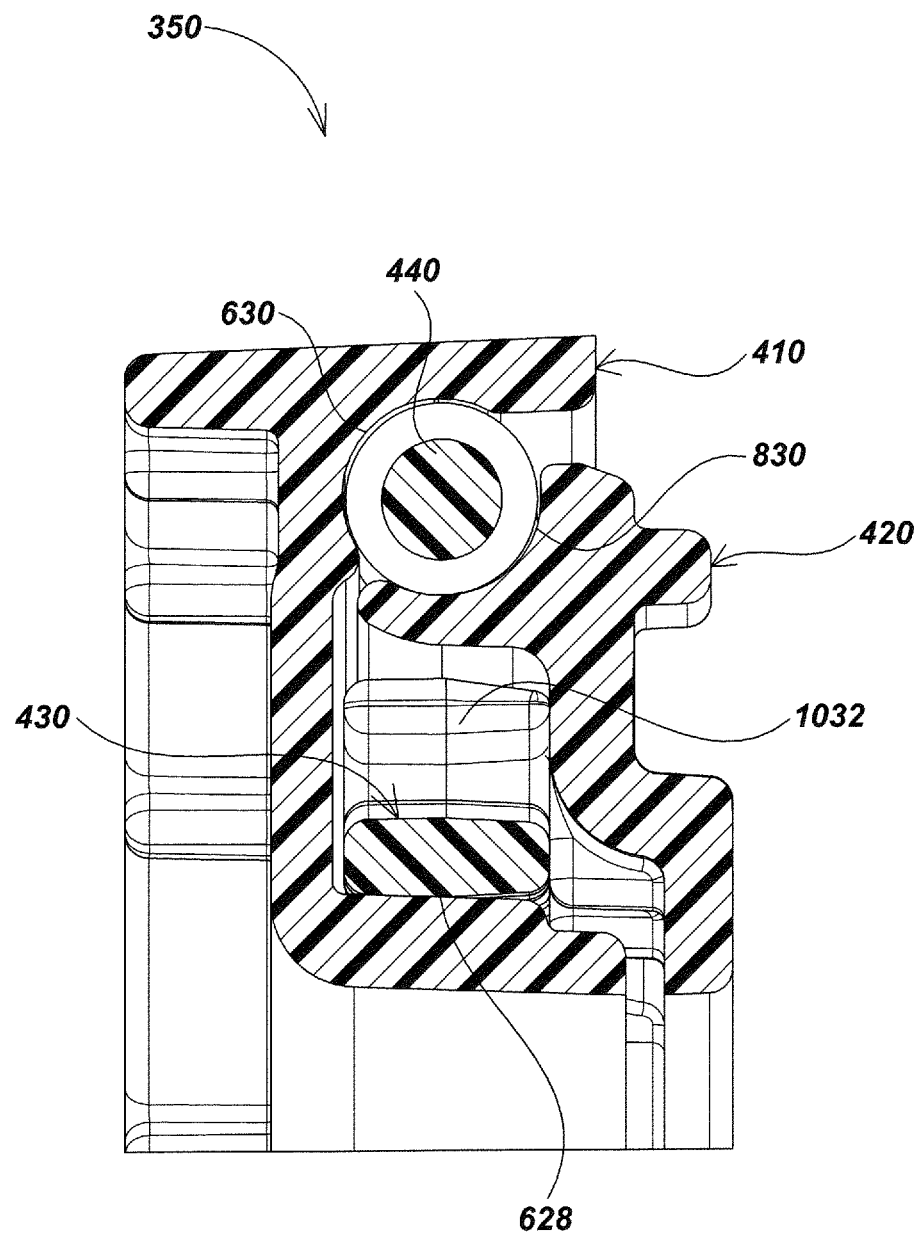
FIG. 14 is an enlarged vertical section view of the asymmetric bearing device embodiment of FIG. 11, taken along line 14-14.

FIG. 14 is a vertical section view of certain details of asymmetric bearing device embodiment 350, taken along line 14-14 (as shown in FIG. 11), illustrating interaction between one of the friction ramps 628 and one of the sliding cogs 430. The friction ramp 628 may be a formed feature of outer race 410, such as shown in FIG. 6. Friction ramp 628, or another similar or equivalent structure, may facilitate movement of sliding cogs 430 during transition from one rotational direction to the other. For example, when in contact with a sliding cog 430, friction ramp 628 may move the cog in a direction of travel along the circumference until the sliding cog 430 abuts a ramp element 840 such as shown in FIG. 11 and FIG. 16.

Figure 15:
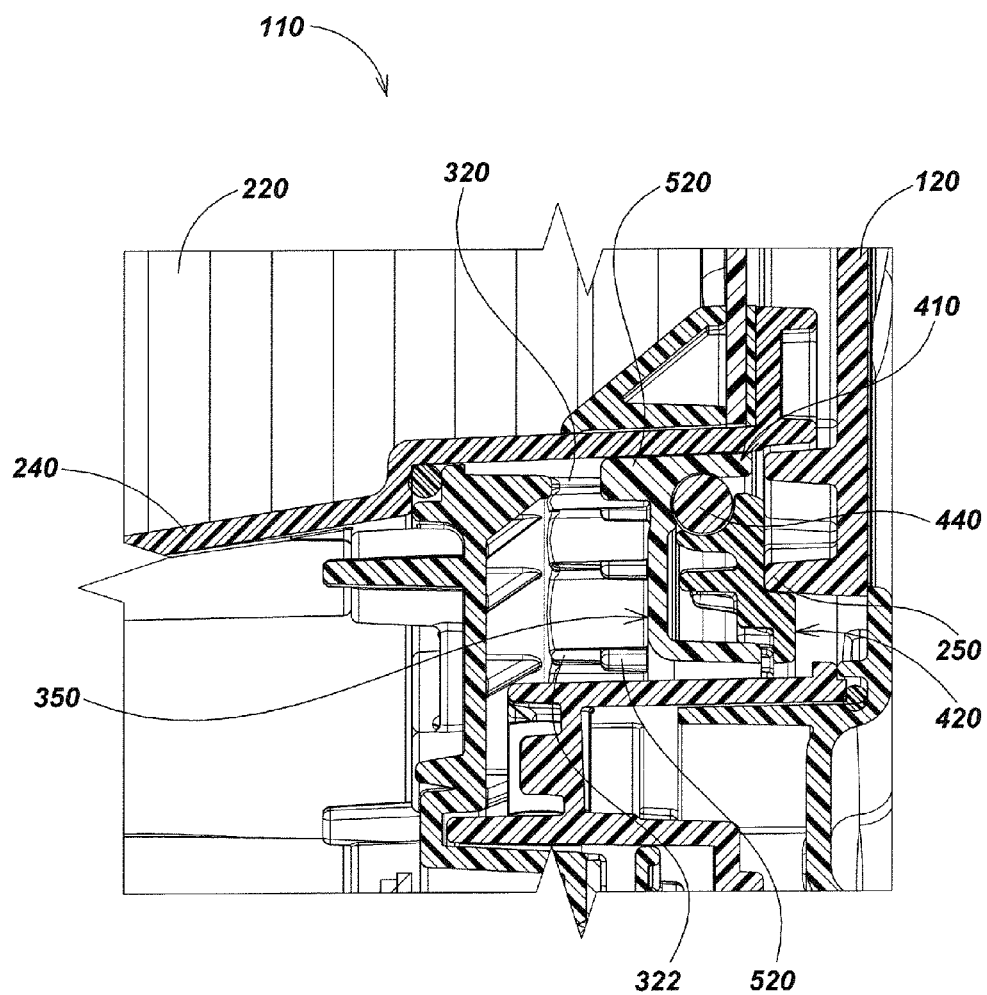
FIG. 15 is an enlarged fragmentary horizontal section view of the cable storage drum assembly embodiment of FIG. 1, taken along line 15-15.

Turning to FIG. 15, a fragmentary horizontal section view of the cable storage drum assembly embodiment 110, taken along line 15-15 (as shown in FIG. 1), is illustrated showing example positioning of asymmetric bearing device embodiment 350. As shown in FIG. 15, outer race 410 may be seated below frusto-conical member 240, and axial slots 322 may be configured to receive individual outer race keying structures 520 (such as shown in FIG. 5).

In addition to the previously described embodiments of the asymmetric bearing, modifications and adaptations thereof will be apparent to persons skilled in the art. For example, a converse arrangement of the friction mechanism between the inner and outer races may also be utilized. Where components have been described as plastic, a wide array of other materials such as metals, ceramics, or other suitable materials may also be used.

Various other changes, additions, and/or alterations may be used in various embodiments. For example, in some embodiments, other rotatable friction reducing members such as roller bearings or cone bearings may be used as an alternative to ball bearings. Other configurations for providing variable friction within a bearing assembly may also be used in addition to or in place of the cog, rib, and ramp element embodiments described herein.

While the illustrated example pipe inspection system 100 uses a clam shell housing to support the cable storage drum, an open frame may be utilized with the asymmetric bearing instead of a housing that encloses the cable storage drum. An example of such an open frame configuration is illustrated in U.S. Pat. No. 6,545,704, entitled VIDEO PIPE INSPECTION DISTANCE MEASURING SYSTEM, issued Apr. 8, 2003, the content of which is hereby incorporated by reference herein.

Though an exemplary use of the asymmetric bearing device described herein is with a pipe inspection system such as system 100, other devices and apparatus may alternately use such an asymmetric bearing. For example, other devices that utilize a rotary drum wherein variable friction or loading may be advantages may be implemented with embodiments of the present disclosure. In some of these apparatuses, a greater resistance to the pay-in direction than the pay-out direction may be advantageous and achieved through reversing the orientation of the slider and ramp elements.

In some configurations, the mechanism, elements, apparatus, or systems described herein may include means for implementing features or providing functions described herein. In one aspect, the aforementioned means may be a mechanism for providing variable friction in a bearing assembly, such as through use of a sliding or otherwise movable or changeable element to provide variable friction depending on direction of motion.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel aspects and features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A pipe inspection system, comprising:
a housing;
a cable storage drum;
a flexible push-cable disposed on the cable storage drum; and
an asymmetric bearing device supporting the cable storage drum for rotation within the housing, the asymmetric bearing device including;
a first race;
a second race; and
a cog assembly disposed between the first race and the second race, wherein the cog assembly is configured to provide a first friction level between the first and second race during a rotation of the asymmetric bearing device in a first direction, and a second friction level between the first and second race during a rotation of the asymmetric bearing device in a second direction.

2. The system of claim 1, wherein the first race includes a cog movement control assembly configured to interact with the cog assembly to facilitate changes in friction between the first friction level and the second friction level.

3. The system of claim 2, wherein the cog movement control assembly includes a ramp element.

4. The system of claim 2, wherein the cog movement control assembly further includes a cog rib.

5. The system of claim 4, wherein the cog movement control assembly includes a cog rib.

6. The system of claim 1, wherein the cog assembly comprises a plurality of cogs configured to controllably move between a first position to provide the first friction level and a second position to provide the second friction level.

7. The system of claim 6, wherein the cogs are positioned in contact with a ramp element at a first ramp position and a rib element at a first rib position to provide the first friction level, and the cogs are positioned in contact with the ramp element at a second ramp position and the rib element at a second rib position to provide the second friction level.

8. The system of claim 6, further comprising a friction element configured to interact with the cogs to facilitate movement of the cogs between the first and second positions.

9. The bearing device system of claim 8, wherein the friction element comprises a friction ramp.

10. The bearing device system of claim 9, wherein the cogs include a midsection configured to engage the with the friction ramp to change the friction level between the first friction level and the second friction level.

11. The system of claim 6, wherein the cogs are configured to be relaxed when placed in the first position and flexed when in the second position, and wherein the cogs are configured to contact a friction element in the flexed position to provide the second friction level.

12. The system of claim 6, wherein the cogs include a U-shaped first cog end, a round or bulb-shaped second end, and an angular mid-section.

13. The system of claim 12, wherein the angular mid-section is configured to contact a friction element to provide one of the first or second friction levels responsive to movement of the cogs.

14. The system of claim 1, further compnsmg a locking mechanism configured to lock the first and second races to contain the cog assembly and a plurality of bearings.

15. The system of claim 1, further comprising a camera coupled to the flexible push-cable.

16. The system of claim 1, wherein the first race includes a cog movement control assembly configured to interact with the cog assembly to facilitate changes in friction between the first friction level and the second friction level.

* * * * *